US012589333B2

(12) United States Patent
Berndt et al.

(10) Patent No.: US 12,589,333 B2
(45) Date of Patent: Mar. 31, 2026

(54) DEGASSER WITH TWO WEAKLY COUPLED SPACES AND/OR WITH A RESTRICTION ADJUSTMENT DEVICE

(71) Applicant: Agilent Technologies, Inc., Santa Clara, CA (US)

(72) Inventors: Manfred Berndt, Karlsruhe (DE); Konstantin Shoykhet, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 326 days.

(21) Appl. No.: 18/227,107

(22) Filed: Jul. 27, 2023

(65) Prior Publication Data

US 2024/0033658 A1      Feb. 1, 2024

(30) Foreign Application Priority Data

Jul. 28, 2022    (DE) ..................... 10 2022 118 973.2

(51) Int. Cl.
B01D 19/00        (2006.01)
B01D 15/16        (2006.01)

(52) U.S. Cl.
CPC ....... B01D 19/0031 (2013.01); B01D 15/166 (2013.01)

(58) Field of Classification Search
CPC ............ B01D 19/0031; B01D 19/0063; B01D 19/0073; B01D 15/16; B01D 15/166; G01N 30/34
See application file for complete search history.

(56) References Cited

U.S. PATENT DOCUMENTS

| | | | |
|---|---|---|---|
| 8,668,763 B2 | 3/2014 | Gerner | |
| 2011/0214571 A1 | 9/2011 | Berndt | |
| 2021/0231354 A1* | 7/2021 | Ranjan | ............... B01D 71/0281 |

FOREIGN PATENT DOCUMENTS

| | | |
|---|---|---|
| DE | 112016003938 T5 | 5/2018 |
| EP | 0309596 B1 | 3/1993 |
| EP | 2017615 B1 | 1/2014 |
| EP | 1904213 B1 | 9/2015 |

* cited by examiner

*Primary Examiner* — Robert Clemente

(57)        ABSTRACT

A degasser for degassing a mobile phase includes a degasser chamber with a degasser volume for receiving a degassing membrane, a delimiting unit for delimiting a first space of the degasser volume with respect to a second space of the degasser volume while maintaining a fluid connection between the first space and the second space. The first space in an operation in an environment of the degassing membrane includes a higher partial pressure of vapor of the mobile phase than the second space with a lower partial pressure of vapor of the mobile phase. The degasser further includes a suction unit for sucking a gas that passed through the degassing membrane from the second space, and/or an associated gas supply unit for supplying an associated gas in the second space or in a fluid conduit that is connected to the second space.

16 Claims, 5 Drawing Sheets

DEGASSER WITH TWO WEAKLY COUPLED SPACES AND/OR WITH A RESTRICTION ADJUSTMENT DEVICE

CROSS-REFERENCE TO RELATED APPLICATIONS

This application claims priority under 35 U.S.C. § 119(a) to German Application No. DE 10 2022 118 973.2, filed on Jul. 28, 2022; the entire contents of which are incorporated by reference herein.

TECHNICAL FIELD

The present invention relates to degassers, a sample separation device, and methods for degassing a mobile phase.

BACKGROUND

In a high-performance liquid chromatography (HPLC) system, typically a liquid (mobile phase) is moved at a very precisely controlled flow rate (for example in a range of microliters to milliliters per minute or up to some hundred milliliters per minute or more in preparative applications) and at a high pressure (typically 20 to 1000 bar or more, presently up to 2000 bar), where the compressibility of the liquid is noticeable, through a so-called stationary phase (for example in a chromatographic column), to separate single components of a sample liquid which is introduced in the mobile phase from each other. Such an HPLC system is known from EP 0,309,596 B1 of the same applicant, Agilent Technologies, Inc., for example.

Such an HPLC system frequently includes a degasser which at least partially removes gas bubbles from the mobile phase and/or gases which are dissolved therein before reaching the fluid pump. Gas bubbles disturb the regular flow of the eluant (since sucking a liquid with gas bubbles may lead to sucking erroneous liquid amounts) and lead to a noise in the detector and to further chromatographic artifacts.

U.S. Pat. No. 8,668,763 B2 discloses a liquid degassing device which is arranged such that a cross-contamination with vaporized solvent is prevented. The cross-contamination between a multiplicity of degassing modules is counteracted by specially configured volumes and venting inlet streams to conduits which fluidically couple the permeate sides of this multiplicity of degassing chambers.

However, it is still difficult to effectively degas a mobile phase in an HPLC system.

SUMMARY

It is an object of the present disclosure to provide an effective degassing system, in particular for a sample separation device.

According to an exemplary embodiment of a first aspect of the present disclosure, a degasser for degassing a mobile phase is provided, wherein the degasser comprises a degasser chamber with a degasser volume for receiving a degassing membrane (for example, between a mobile phase supply for supplying a mobile phase which is to be at least partially degassed and a mobile phase discharge for discharging a mobile phase which is at least partially degassed), a delimiting unit for delimiting a first space of the degasser volume with respect to a second space of the degasser volume while maintaining a fluid connection between the first space and the second space, wherein the first space in an operation in an environment of the degassing membrane comprises a higher partial pressure of vapor of the mobile phase than the second space with a lower partial pressure of vapor of the mobile phase, and a suction unit for sucking gases which passed through the degassing membrane from the second space.

According to an exemplary embodiment of a second aspect of the present disclosure, a degasser for degassing a mobile phase is provided, wherein the degasser comprises a plurality of degasser chambers, each of which being adapted with a degasser volume for receiving a degassing membrane (for example, between a mobile phase supply for supplying a mobile phase which is to be at least partially degassed and a mobile phase discharge for discharging a mobile phase which is at least partially degassed), at least one suction unit for sucking a gas which passed through the respective degassing membrane from a respective one of the degasser chambers (in particular a plurality of sucking units, each of which being adapted for sucking a gas which passed through a respective degassing membrane from a respective one of the degasser chambers) and/or at least one associated gas supply unit for supplying an associated gas in a respective one of the degasser chambers or in a fluid conduit which is connected to the respective one of the degasser chambers (in particular a plurality of associated gas supply units, each of which being adapted for supplying the associated gas in a respective one of the degasser chambers or in a fluid conduit which is connected to the respective one of the degasser chambers), and at least one restriction adjustment unit for separately adjusting a fluidic restriction in a respective one of the at least one suction unit and/or in a respective one of the at least one associated gas supply unit.

According to another exemplary embodiment, a sample separation device for separating a fluidic sample (in particular into different fractions which may differ with respect to at least one separation property) is provided, wherein the sample separation device comprises one of the degassers with the above-described features.

According to yet another exemplary embodiment of the first aspect of the present disclosure, a method for degassing a mobile phase is provided, wherein the method comprises receiving, in a degasser chamber with a degasser volume, a degassing membrane (for example, between a mobile phase supply for supplying a mobile phase which is to be at least partially degassed and a mobile phase discharge for discharging a mobile phase which is at least partially degassed), delimiting a first space of the degasser volume with respect to a second space of the degasser volume by a delimiting unit while maintaining a fluid connection between the first space and the second space, wherein the first space, in an operation in an environment of the degassing membrane, comprises a higher partial pressure of vapor of the constituents of the mobile phase than the second space with a lower partial pressure of vapor of the constituents of the mobile phase, and sucking a gas which passed through the degassing membrane from the second space by a suction unit.

According to yet another exemplary embodiment of the second aspect of the present disclosure, a method for degassing a mobile phase is provided, wherein the method comprises providing a plurality of degasser chambers, each of which being adapted with a degasser volume for receiving a degassing membrane (for example, between a mobile phase supply for supplying a mobile phase which is at least partially to be degassed and a mobile phase discharge for discharging a mobile phase which is at least partially degassed), sucking a gas which passed through the respective degassing membrane from a respective one of the degasser chambers by at least one suction unit and/or supplying an associated gas in a respective one of the degasser chambers or in a fluid conduit which is connected to the respective one of the degasser chambers by at least one associated gas supply unit, and separately adjusting a fluidic restriction in a respective one of the at least one suction unit and/or in a respective one of the at least one associated gas supply unit by at least one restriction adjustment unit.

In the context of the present application, the term "degasser" in particular denotes a device which is able to specifically perform processing of a mobile phase in such a way that gas constituents which are dissolved in the liquid (in particular gas bubbles, further in particular gas bubbles and/or dissolved gases, in particular air constituents) are fully or partially removed. In an embodiment, the degasser may accomplish the degassing by pervaporation, i.e. a membrane method for purifying liquid mixtures. In the context of a pervaporation, a membrane may be used through which a gas to be removed diffuses much better than the liquid. For example, degassing may also be performed by conducting the liquid through special hoses during degassing (for example, made of a correspondingly configured material, such as Teflon™ AF material) which is more impermeable for the liquid and is more permeable for the gas constituents. Outside the hose, a vacuum, a low-pressure, or at least a reduced partial pressure with respect to the gases which are to be removed from the liquid may be established. Thereby, the gas constituents can leave the liquid at least partially through the hose wall, such that the liquid is at least partially degassed. Alternatively to the described hose membranes in a degasser, it is also possible to provide a planar permeable degassing membrane which accomplishes a separation of a liquid phase from a vacuum region or a low-pressure region. A degassing membrane may be permeable for gas and vapor.

In the context of the present application, the term "fluid" in particular denotes a liquid and/or a gas, optionally comprising solid particles.

In the context of the present application, the term "mobile phase" in particular denotes a fluid, further in particular a liquid, which serves as a carrier medium for transporting the fluidic sample between a fluid drive and a sample separation unit. However, the mobile phase may also be used in a fluid drive for influencing the fluidic sample. For example, the mobile phase may be a (for example organic and/or inorganic) solvent or a solvent composition (for example water and ethanol) in which also gas constituents may be contained.

In the context of the present application, the term "fluidic sample" in particular denotes a medium, further in particular a liquid, which contains the material which is actually to be analyzed (for example a biologic sample), such as a protein solution, a pharmaceutical sample, etc.

In the context of the present application, the term "sample separation device" may in particular denote a device which is capable and configured to separate a fluidic sample, in particular into different fractions. For example, the sample separation may be performed by chromatography or electrophoresis. In an embodiment, the sample separation device may be a liquid chromatography sample separation device, in particular an HPLC device.

In the context of the present application, the term "fluid drive" in particular denotes a unit for conveying a fluid. For example, a fluid drive may comprise a pump, for example a piston pump.

In the context of the present application, the term "sample separation unit" in particular denotes a unit for (in particular chromatographically or electrophoretically) separating a fluidic sample. In particular, a sample separation unit may comprise a stationary phase which is adapted for separating the fluidic sample. For example, a sample separation unit may be a chromatographic separation column.

In the context of the present application, the term "degassing membrane between mobile phase supply and mobile phase discharge" in particular denotes a (for example hose-like or a planar) membrane which may be attached between a supply (for example a supply hose) for supplying a mobile phase to be degassed and a discharge (for example a discharge hose) for discharging partially degassed mobile phase. For example, the membrane may be a permeable portion of a common hose between a supply portion and a discharge portion. It is also possible to provide a planar membrane which, on the one hand, is supplied with the mobile phase to be degassed and from which, on the other hand, the partially degassed mobile phase is discharged. In particular, at least partially degassing the mobile phase at the membrane may be performed by pervaporation.

In the context of the present application, the term "delimiting unit for delimiting two spaces while maintaining a fluid connection" in particular denotes a mechanical or fluidic barrier between the two (or more) spaces, which specifically reduces the fluid connection between the spaces, but does not completely prevent a fluidic connection between the both spaces. Descriptively, a delimiting unit may specifically cause a weak fluid coupling between the spaces. For example, delimiting the spaces may be performed by an additional fluidic restriction which is provided by the delimiting unit. Descriptively, by such a delimiting, it may be caused that, additionally to a desired gas flow from the mobile phase to be degassed through a degassing membrane, a liquid vapor of the mobile phase which is undesirably passing through the degassing membrane is prevented from being actively transported from the first space which receives the degassing membrane into the second space (for example by a gas drawing of the associated gas).

In the context of the present application, the term "different partial pressures of vapor of the constituents of the mobile phase in two spaces" in particular denotes that a liquid vapor of the mobile phase which is undesirably passing through the degassing membrane, due to the delimiting unit, is more strongly enriched in the space which receives the degassing membrane than in another space of the degasser chamber which is weakly coupled with it.

In the context of the present application, the term "suction unit for sucking a gas" in particular denotes a unit which sucks the gas which is removed from a mobile phase from the degasser chamber, such as from a space of the degasser chamber which is facing away from the degassing membrane. For example, such a suction unit may be configured as a vacuum pump, to which the at least one fluid conduit may be connected. Also the liquid vapor from the mobile phase which is undesirably passing through the degassing membrane may be partially sucked by the suction unit.

In the context of the present application, the term "associated gas supply unit" may in particular denote a unit which supplies an associated gas (for example ambient air or another gas, for example nitrogen) to the degasser chamber. In this context, the term associated gas may express that a gas is added to the degasser chamber. The supply of associated gas in the degasser chamber may advantageously suppress a condensation in the degasser chamber and may inhibit an undesired crossflow of vapor between the degasser chambers, when multiple degasser chambers are provided. Moreover, the supply of associated gas in the degasser chamber may advantageously contribute to adapting a gas pressure in different spaces of a degasser chamber, in particular adjusting to be substantially the same by a balance of pressure differences.

In the context of the present application, the term "restriction" in particular denotes a measure, a degree, or a value of a flow resistance, a fluidic resistance, or a flow obstruction which is counteracting a fluid which is flowing along a flow path. In a normal state, a fluid which is flowing through a fluid conduit, for example, may be subjected to a flowing restriction which is influenced by the friction with the conduit wall and by the fluid itself. For example, a flowing restriction which is increased with respect to a normal flow may be generated by a full or partial blocking of a flow path, for example caused by at least partially closing a fluid valve, an elongation of a flowing part and/or a narrowing of a flow channel.

In the context of the present application, the term "restriction adjustment unit" may in particular denote a unit by which a fluidic restriction in a suction unit and/or in an associated gas supply unit may be variably adjusted. For example, this may be performed by an active control (for example by an active fluid valve which is user-controlled or controlled by a control unit) or by a passive control (for example a passive fluid valve).

According to an exemplary embodiment of the first aspect, a degasser for degassing a mobile phase by a degassing membrane in a degasser chamber is provided. Advantageously, two spaces of the degasser chamber are delimited from each other, such that a first space which comprises the degassing membrane comprises a higher partial pressure of vapor of the mobile phase than a second space which is delimited from it, from which the gas is sucked which is removed from the mobile phase. Additionally to the gas flow from the mobile phase which is desired during degassing through the degassing membrane in the degasser chamber, there is always also a technically unavoidable slight penetration of the degassing membrane by the liquid or liquid vapor of the mobile phase. Advantageously, such a liquid and/or such a liquid vapor, due to the delimitation of both spaces of the degasser chamber, may remain mainly in the first space with the degassing membrane and reaches only to a low extent the second space of the degasser chamber which is functionally facing a suction device. Thereby, undesirably sucking the liquid vapor may be strongly suppressed without significantly compromising a desired sucking of the gas. Descriptively, by the described degasser architecture, an undesired vapor drift may be strongly suppressed. Thereby, an effective degassing system can be provided which is in particular suitable for degassing the mobile phase in a sample separation device.

According to an exemplary embodiment of the second aspect, a degasser with multiple degasser chambers with a respective degassing membrane for degassing a respective mobile phase is provided. By a or a respective sucking unit, from an assigned degasser chamber, the gas may be sucked which is separated from the mobile phase. Alternatively or additionally, it is possible, by one or a respective associated gas supply unit, to introduce an associated gas in a respective one of the degasser chambers or in a fluid conduit which is connected to it. Advantageously, the degasser may comprise one or more restriction adjustment units by which (for example actively or passively) the size of a fluidic restriction between a respective degasser chamber and an assigned suction unit and/or an assigned associated gas supply unit can be changed, modified, or adjusted. This may be advantageous, in particular in the case, when in the different degasser chambers different mobile phases (in particular different solvent compositions) are processed. The suction configuration and/or the associated gas configuration may then be individually selected for different degasser chambers. It is also possible to adjust different fluidic resistances in different suction units and/or to adjust different fluidic resistances in different associated gas supply units.

In the following, additional embodiments of the degassers, the sample separation device, and the methods are described.

According to an embodiment, the suction unit may lead into the second space. When the suction unit is directly connected to the second space, an especially effective sucking of the gas may be achieved.

According to an embodiment, the degasser may comprise an associated gas supply unit for supplying an associated gas in the second space or in a fluid conduit which is connected to the second space. Supplying the associated gas advantageously enables strongly suppressing an undesired condensation of vapor, reduces an undesired carryover of a medium between different degasser chambers and promotes a pressure equilibration between the first space and the second space.

According to an embodiment, the associated gas supply unit may lead into the second space. When the associated gas supply unit is directly connected to the second space, an especially effective associated gas supply may be achieved. This applies in particular in the case when also the suction unit leads directly into the second space.

According to an embodiment, the associated gas supply unit may be adapted for supplying air (for example false air). For example, the supplied false air may be ambient air. In this way, the associated gas supply may be realized with an especially low effort, since the supplied associated gas may be taken directly from the environment. However, alternatively, also an associated gas supply using another gas is possible, for example nitrogen or helium.

According to an embodiment, the delimiting unit, the suction unit, and the associated gas supply unit may be configured to generate in the first space and in the second space substantially a same total pressure. Also when the partial pressure of the vapor, which originates from the liquid in the mobile phase, in the first space would be significantly larger than in the second space, the total pressure in both spaces may be substantially or even exactly the same. In particular, this is facilitated by the associated gas supply which may selectively supply the associated gas to the second space.

According to an embodiment, the delimiting unit, the suction unit, and the associated gas supply unit may be configured to generate in the first space and in the second space an underpressure (i.e. a pressure below 1 bar or below the atmospheric pressure), in particular an underpressure in a range from 1 mbar to 500 mbar, further in particular an underpressure in a range from 20 mbar to 200 mbar. To promote an effective degassing of the mobile phase, in the degasser chamber, an underpressure or a vacuum shall be generated, for example a pressure of 100 mbar.

According to an embodiment, the delimiting unit may comprise a delimiting wall between the first space and the second space. Such a delimiting wall may be provided in a simple manner and effectively serve for a desired only weak fluid coupling between the first space and the second space. For example, an impermeable delimiting wall between the first space and in the second space may be provided, which, by at least one opening, enables a precisely adjustable remaining coupling between the first space and the second space. Alternatively, also a porous delimiting wall between the first space and the second space may be implemented, which may be manufactured from a permeable material. The gas which is removed from the mobile phase may then pass from the first space through the porous delimiting wall into the second space and may be sucked there. The material of the porous delimiting wall may have a web-like or foam-like structure. The pores may comprise a characteristic size from 0.1 μm to 1 mm, in particular from 0.01 mm to 0.2 mm.

According to another embodiment, the delimiting unit may comprise a nozzle between the first space and the second space. Such a nozzle constitutes a fluidic restriction which specifically weakens a fluid coupling between the first space and the second space, without completely preventing it. In an embodiment, such a nozzle may be a Venturi nozzle. In particular, such a Venturi nozzle may be adapted in a tube-shaped or in a planar geometry.

According to another embodiment, the delimiting unit may be configured as a mere constriction between a spatial region and another spatial region of a degassing chamber. Furthermore, it is also possible to configure the first space and the second space as separated chambers which are connected with each other, for example by a connection conduit.

According to an embodiment, the first space may be configured as an idle or still gas space. Descriptively, an idle gas space suppresses a gas exchange around a degassing membrane. According to such an embodiment, in the first space, in the environment of the degassing membrane, a region with a very low flow may be formed which advantageously inhibits streaming of vapor of the mobile phase from the first space into the second space.

According to an embodiment, the delimiting unit may be adapted to inhibit a flow of vapor of the mobile phase from the first space into the second space. In particular, the delimiting unit may be configured to prevent an active transmission (such as a passing of an associated gas). Thereby, it may be avoided, that the vapor of the mobile phase is sucked from the degasser chamber to a large extent.

According to an embodiment, the degasser may comprise at least one restriction adjustment unit for adjusting a fluidic restriction in the suction unit and/or in the associated gas supply unit. This may be desired especially in a scenario when multiple degasser chambers with different mobile phases are present. The suction characteristic or the associated gas characteristic may then be separately adjusted for the single degasser chambers.

According to an embodiment, the degasser may comprise at least one further degasser chamber with at least one further degasser volume for receiving at least one further degassing membrane (for example between at least one further mobile phase supply for supplying at least one further mobile phase which is to be at least partially to be degassed and at least one further mobile phase discharge for discharging at least one further at least partially degassed mobile phase), at least one further delimiting unit for delimiting at least one further first space with respect to at least one further second space of the at least one further degasser volume while maintaining a fluid connection between the at least one further first space and the at least one further second space, wherein the at least one further first space in an operation in an environment of the at least one further degassing membrane comprises a higher partial pressure of vapor of the at least one further mobile phase than the at least one further second space with a lower partial pressure of vapor of the at least one further mobile phase, at least one further suction unit for sucking a gas which passed through the at least one further degassing membrane from the at least one further second space, and optionally at least one further associated gas supply unit for supplying an associated gas in the at least one further second space. In other words, multiple degasser chambers may be provided at the degasser, each of which may be operated in the above-described manner. In this way, the degasser may be arbitrarily scaled.

According to an embodiment, the suction unit and the at least one further suction unit may be in fluid connection with each other, in particular may comprise a commonly used suction source. For example, the commonly used suction source may be a commonly used vacuum pump which may be connected to individual suction conduits of different suction units (in particular individual suction conduits which may lead to the single degasser chambers). The vacuum pump may then suck the gas from multiple or all degasser chambers. This serves for an especially compact configuration of the degasser.

According to an alternative embodiment, the suction unit and the at least one further suction unit may be fluidically separated from each other, in particular comprise separated suction sources. Thus, it is alternatively also possible to provide for each suction unit an individually assigned suction source and an individually assigned suction conduit, for example the same number of vacuum pumps and degasser chambers.

According to an embodiment, the associated gas supply unit and the at least one further associated gas supply unit may be in fluid connection with each other, in particular may comprise a commonly used associated gas source. For example, the commonly used associated gas source may be a commonly used gas terminal (such as a false gas terminal) which may be connected to individual associated gas supply conduits (which may lead to the single degasser chambers). The gas terminal may then lead gas to all degasser chambers. This serves for an especially compact configuration of the degasser.

According to an alternative embodiment, the associated gas supply unit and the at least one further associated gas supply unit may be fluidically separated from each other, in particular comprise separated associated gas sources and assigned associated gas conduits. Thus, it is alternatively also possible to provide for each associated gas unit an individually assigned associated gas source, for example a same number of gas terminals (in particular for providing different gases) and degasser chambers.

According to an embodiment, the degasser may comprise at least one restriction adjustment unit for separately adjusting a fluidic restriction in a respective one of the suction units and/or in a respective one of the associated gas supply units. Then, the restriction may be individually adjusted for a respective suction unit or associated gas supply unit.

According to an embodiment, the at least one restriction adjustment unit may be selected from a group which consists of at least one actively controllable restriction adjustment unit, in particular at least one actively controllable fluid valve, and at least one passive restriction adjustment unit, in particular at least one passive nozzle. An actively controllable restriction adjustment unit enables an active influence on the restriction(s) and therefore a precise adjustment based on the requirements of an application. A passive restriction adjustment unit may also be a passive diffuser or a tapered portion of a fluidic conduit. A portion of a fluidic conduit which serves as restriction adjustment unit may comprise at least one curve and/or at least one arc for increasing the fluidic restriction. An active restriction unit may be adjustable by a user setting or automatically. An automatic adjustment may be performed due to the knowledge of the properties of the mobile phase which is respectively to be degassed or by the evaluation of the gas flow and/or vapor flow which originates from the respective degasser chamber. A passive restriction adjustment unit enables an adjustment of restrictions without a user activity being required.

According to an embodiment, the at least one restriction adjustment unit may be selected from a group which is consisting of at least one actively controllable restriction adjustment unit, in particular at least one actively controllable fluid valve, and at least one passive restriction adjustment unit, in particular at least one passive nozzle. All other actions which increase or decrease the flow resistance (for example narrowing or enlarging a lumen of a fluid conduit) are also possible for adjusting the restriction.

According to an embodiment, each of the degasser chambers may comprise an assigned delimiting unit for delimiting a first space with respect to a second space of the respective degasser volume while maintaining a fluid connection between the first space and the second space, wherein the first space in an operation in an environment of the degassing membrane comprises a higher partial pressure of vapor of the mobile phase than the second space with a lower partial pressure of vapor of the mobile phase, and an assigned suction unit for sucking the gas which passed through the degassing membrane from the second space. In this way, unintentionally sucking the liquid vapor is inhibited, without negatively influencing the desired sucking of the gas which is separated from the mobile phase. In this way, a vapor drift in the degasser can be significantly reduced. This improves the efficiency of the degassing system and prevents or reduces possible composition changes of the mobile phase(s) to be degassed during degassing.

The sample separation device may be a microfluidic measuring device, a life science device, a liquid chromatography (LC) device, a high-performance liquid chromatography (HPLC) device, an ultra-high-performance liquid chromatography (UHPLC) device, a supercritical liquid chromatography (SFC) device, a gas chromatography (GC) device, an electric chromatography device and/or a gel electrophoresis device. However, many other applications are possible.

For example, the fluid pump may be adapted for conveying the mobile phase with a high pressure, for example multiple 100 bar up to 1000 bar and more, through the system.

The sample separation device may comprise a sample injector for introducing the sample in the fluidic separation path. Such a sample injector may comprise an injection needle which is couplable with a seat in a corresponding liquid path, wherein the needle may be moved out of this seat, to receive the sample, wherein, after reintroducing the needle into the seat, the sample is located in a liquid path which, for example by switching a valve, can be connected with the separation path of the system, which leads to introducing the sample into the fluidic separation path.

The sample separation device may comprise a fraction collector for collecting the separated components. Such a fraction collector may lead the different components into different liquid containers, for example. However, the analyzed sample may also be supplied to a drain container.

In an embodiment, the sample separation device may comprise a detector for a detection of the separated components. Such a detector may generate a signal which may be observed and/or recorded and which is indicative for the presence and the amount of the sample components in the fluid which is flowing through the system.

BRIEF DESCRIPTION OF THE DRAWINGS

Other objects and many of the accompanying advantages of embodiments of the present disclosure are easy to recognize and better to understand with reference to the following detailed description of embodiments in connection with the accompanied drawings. Features which are substantially or functionally the same or similar are provided with the same reference signs.

Figure 1:
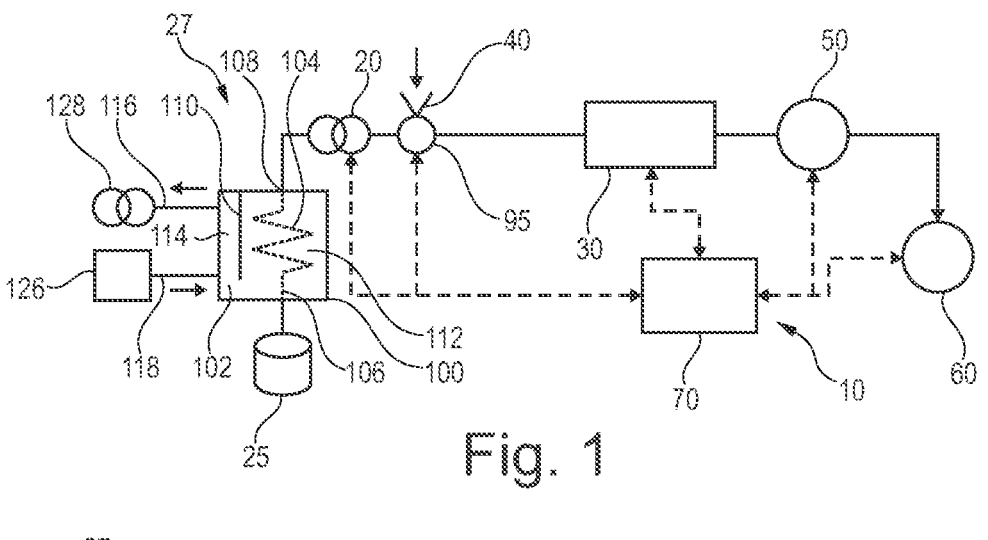
FIG. 1 shows a sample separation device with a degasser according to an exemplary embodiment of the present disclosure.

The illustrations in the drawings are schematic.

DETAILED DESCRIPTION

Before referring to the drawing figures and describing exemplary embodiments, some basic considerations shall be summarized, based on which exemplary embodiments of the present disclosure are derived.

Exemplary embodiments of the present disclosure concern a degasser for removing dissolved gases from a liquid mobile phase. The degasser may encompass multiple degasser chambers, wherein a mobile phase supply (via which the liquid streams in) with a membrane surface is subjected to a vacuum or underpressure. As a consequence, in the liquid mobile phase, dissolved gases are separated from the liquid and pass through the degassing membrane into the degasser chamber. Each degasser chamber may be coupled with a vacuum pump as a suction source for sucking separated gas. To keep the effort low, only one vacuum pump for multiple degasser chambers may be utilized. The multiple degasser chambers may be fluidically coupled with the vacuum pump by a distributor system, to thereby form a separate suction unit for each degasser chamber.

By supplying an associated gas (for example air, such as ambient air), an undesired condensation of the vapors of the mobile phase(s) in the degasser may be avoided. Such a supplying of associated gas also prevents an undesired carryover of dissolved solvent gases from a degasser chamber into another one.

Thus, according to an exemplary embodiment of the present disclosure, a degasser with a degasser chamber may be provided which encompasses an air ballast terminal or connection as associated gas supply unit and may be configured for a very low infiltration of the degasser chamber by air which streams in via this air ballast terminal.

According to an embodiment of a first aspect of the present disclosure, each degasser chamber may be configured such that (under operating conditions) two different regions or spaces are formed in the degasser chamber. The first space (in an environment of the mobile phase supply) has a higher partial pressure of solvent vapor, whereas the second space comprises a lower partial pressure of solvent vapor. In an embodiment, a coupling of a vacuum pump as suction source and an associated gas supply and venting may be performed at the second, space which in turn leads to a lower partial pressure of the solvent vapor within this second space. In other words, the degasser chamber may be filled in the first space with a higher partial pressure of solvent vapor or solvent gases and in the second space which is at least partially separated from it with a lower partial pressure of solvent vapor or solvent gases (which may be promoted by the described venting and coupling of the vacuum pump). The limited separation into the two regions or spaces may be accomplished by the provision of a separation wall with an opening or a Venturi-nozzle or a porous separation wall, for example. Hence, special advantages may be achieved by partitioning the degasser chamber into two separate chambers with a specifically weak fluid coupling.

In this way, with advantage, a reduction of the depletion velocity of mobile phase vapor in the degasser chamber with a simultaneous reduction or even elimination of a carryover of fluid between different degasser chambers may be achieved. At the same time, a high degassing efficiency may be ensured by sucking in false air (in particular ambient air) via a terminal at the degasser chamber, but distributing it in the degasser chamber as little as possible. On the other hand, solvent vapor which possibly passes through the membrane shall remain in the vicinity of the degassing membrane and shall be removed and/or displaced from the environment of the membrane such as only passively (i.e., not by an external gas stream or airflow, but only by the further gas supply through the membrane and/or diffusion). By this, it may be achieved that the partial pressure difference (in more detail in the gradient of the chemical potential) of the solvent on both sides of the membrane, i.e., in the liquid solvent and in the vacuum region, is low. Thereby, only a small amount of solvent escapes through the membrane (for example a hose membrane), wherein thereby an influence on the composition accuracy of the mobile phase is reduced. When the degasser chamber is saturated with solvent vapor, this also means that the partial pressure difference for the air which is dissolved in the solvent between the hose membrane and the interior of the degasser chamber (i.e., on both sides of the membrane) is large, which promotes the actual degassing function. Thus, by the described measures, on the one hand an advantageous reduction of the depletion velocity may be achieved, on the other hand a false air supply remains still enabled, wherein thereby an infiltration by the solvent from a degasser chamber in one or more neighboring degasser chambers is prevented.

According to an embodiment of a second aspect of the present disclosure, a suction unit and/or an associated gas supply unit, by a restriction adjustment unit, may be capable for individually adjusting a respective fluidic restriction. Descriptively, the venting path and/or the vacuum supply path may be structured, such that the flow resistance and one or more of the flow paths can be individually adjusted. Thereby, with advantage, the flow conditions for each degasser chamber may be individually regulated. In particular, this may be performed actively (for example by providing active valves) or passively (for example by providing adjustable fluidic resistances). In this way, individually adjusting the flow resistances may be enabled.

In particular, a degasser according to an exemplary embodiment of the present disclosure may be equipped with the ability to provide partial spaces with a different partial pressure of the vapors or gases. For this purpose, in a degassing chamber, a first subspace or partial space may be located, in which a mobile phase supply for supplying the mobile phase to be degassed is located and in which the actual degassing is performed. The second partial space or subspace may be provided with a terminal to the vacuum pump and with a venting inlet. By the fluidic coupling of the second subspace with a vacuum pump and with the venting inlet, the partial pressure of the gases and vapors which are dissolved from the mobile phase in the first subspace may be higher than in the second subspace. The separation between the first and the second subspace may be achieved by a separation wall or a nozzle, for example.

A degasser according to an embodiment of the present disclosure may be equipped with an associated gas supply unit (in particular an air supply terminal) directly at the degasser chamber. In particular, the combination of false air stream guiding conduits at a point may be desirable, so that only one restriction element (in particular with a filter) may be sufficient, therefore not respectively one restriction element for each of the degasser chambers has to be provided. An associated benefit may be seen in the reduction of the construction size and in the simplified manufacturing of a degasser. It may be advantageous to provide the fluidic connection conduits between a combination point of the false air conduits and the inlets at the degasser chambers with a same length, to enable discharging the solvent vapors in each degasser chamber in a manner which is as homogenously efficient as possible.

FIG. 1 shows the basic structure of an HPLC system as an example of a sample separation device 10 as it may be used for a liquid chromatography, for example. A fluid pump or a fluid drive 20 which is supplied with solvents from a supply unit with a liquid reservoir 25 drives a mobile phase (that is a liquid) through a sample separation unit 30 (such as a chromatographic column) which includes a stationary phase. A degasser 27 may degas the solvents before these are supplied to the fluid drive 20. A sample insertion or injection unit 40 with a fluidic switching valve 95 is arranged between the fluid drive 20 and the sample separation unit 30, to introduce a sample liquid in the fluidic separation path. The stationary phase of the sample separation unit 30 is provided for separating the components of the fluidic sample. A detector 50 which comprises a flow cell detects the separated components of the sample, and a fractionator may be provided to output the separated components of the sample in containers which are provided for this purpose. Liquids which are not required anymore may be output in a drain container 60. A control unit 70 controls the single components 20, 30, 40, 50, 60, 95 of the sample separation device 10.

Embodiments of a degasser 27 according to exemplary embodiments of the present disclosure are described in the following in more detail referring to FIG. 1 and the further FIGS. 2 to 9.

In FIG. 1, the structure of the degasser 27 for degassing the mobile phase is illustrated. The degasser 27 contains a degasser chamber 100 with a degasser volume 102 which is delimited therein. In this degasser volume 102 of the degasser chamber 100, a degassing membrane 104 is accommodated.

As illustrated in FIG. 1, the degassing membrane 104 is arranged between a mobile phase supply 106 for supplying a mobile phase to be degassed and a mobile phase discharge 108 for discharging the degassed mobile phase.

It is also possible that the degassing membrane 104 constitutes at least a part of a separation wall between a space which contains a mobile phase to be degassed and an evacuated first space 112, wherein the space which contains a mobile phase to be degassed is fluidically connected with a mobile phase supply 106 for supplying a mobile phase to be degassed and a mobile phase discharge 108 for discharging the degassed mobile phase.

Exemplary embodiments may thus be implemented using a hose membrane degasser, but also using a planar membrane degasser or any other degasser type.

For example, the mobile phase supply 106 may be a hose which delivers the mobile phase from the liquid reservoir 25 to the degassing membrane 104. For example, the degassing membrane 104 may be configured as a semi-permeable hose portion which is connected to the hose of the mobile phase supply 106. The mobile phase discharge 108 may also be a hose which delivers the degassed mobile phase from the degassing membrane 104 to the fluid drive 20.

At the degassing membrane 104, the gas which is to be removed from the liquid of the mobile phase may pass through the degassing membrane 104 into the degasser volume 102. An additional phenomenon is that, to a certain extent, also the liquid of the mobile phase may pass through the degassing membrane 104 into the degasser volume 102. Therefore, in the degasser volume 102, during the operation, both gas which is desirably removed from the mobile phase and an unavoidable amount of solvent vapor of the liquid mobile phase may be present.

Advantageously, at the degasser 27, a delimiting unit 110 for delimiting a first space 112 of the degasser volume 102 with respect to a second space 114 of the degasser volume 102 is provided. The delimiting unit 110 is configured as impermeable separation wall according to FIG. 1 and is provided with a connection slit between the first space 112 and in the second space 114. Due to this design of the separation wall, a fluid connection between the first space 112 and the second space 114 is strongly reduced, but not completely eliminated due to the connection slit. Descriptively, due to the illustrated delimiting unit 110, the first space 112 and the second space 114 may be in a weak fluid communication with each other. In other words, the delimiting unit 110 suppresses a gas flow between the first space 112 and the second space 114. Due to the weak fluid connection between the first space 102 and the second space 114, a free exchange of gas and vapor which passed through the degassing membrane 104 in the first space 112, between the first space 112 and the second space 114 is made impossible. As a consequence, during the operation of the degasser 27, in the first space 112, in an environment of the degassing membrane 104, a higher partial pressure of vapor of the mobile phase arises than in the second space 114, where a lower partial pressure of vapor of the mobile phase arises. In a corresponding manner, also the partial pressure of the vapor of the mobile phase in the first space 112 may be lower than in the second space 114. Descriptively, by the described delimiting unit 110 in the first space 112, an idle gas space is created in which no or only a low fluid motion occurs. This advantageously prevents that an excessive amount of vapor from the first space 112 is transferred in the second space 114.

FIG. 1 further shows a suction unit 116 which is connected to the second space 114. The suction unit 116 connects the second space 114 via a fluid conduit with a suction source 128 which is configured as a vacuum pump. The latter sucks the gas which passed through the degassing membrane 104 from the second space 114 and the vapor which is present in the second space 114 with the lower partial pressure. Due to this suction effect, in the second space 114, a significantly more pronounced fluidic motion occurs than in the first space 112. Descriptively, by the weak fluid coupling between the spaces 112, 114, which is caused by the delimiting unit 110, an excessive drift of solvent vapor is avoided. This leads to effectively degassing the mobile phase in the degasser 27, while the loss amount of the components of the mobile phase to be degassed is kept low or is even minimized.

Moreover, FIG. 1 shows that the degasser 27 comprises an associated gas supply unit 118 for supplying an associated gas in the second space 114, descriptively a venting of the second space 114 of the degasser chamber 102. Like the suction unit 116, also the associated gas supply unit 118 is only directly connected to the second space 114 and is fluidically decoupled from the first space 112 to a large extent due to the delimiting unit 110. The associated gas is introduced from an associated gas source 126, such as a source of ambient air, via a fluid conduit of the associated gas supply unit 118 into the second space 114. For example, the associated gas source 126 may introduce the ambient air which may also be denoted as false air, in the second space 114. Advantageously, this prevents a condensation and leads to a pressure equilibration between the first space 112 and the second space 114, such that both spaces 112, 114 may have substantially the same total pressure. The pressure in the spaces 112, 114, compared to atmospheric pressure, may be an underpressure, may have an absolute value of 100 mbar, for example.

Figure 2:
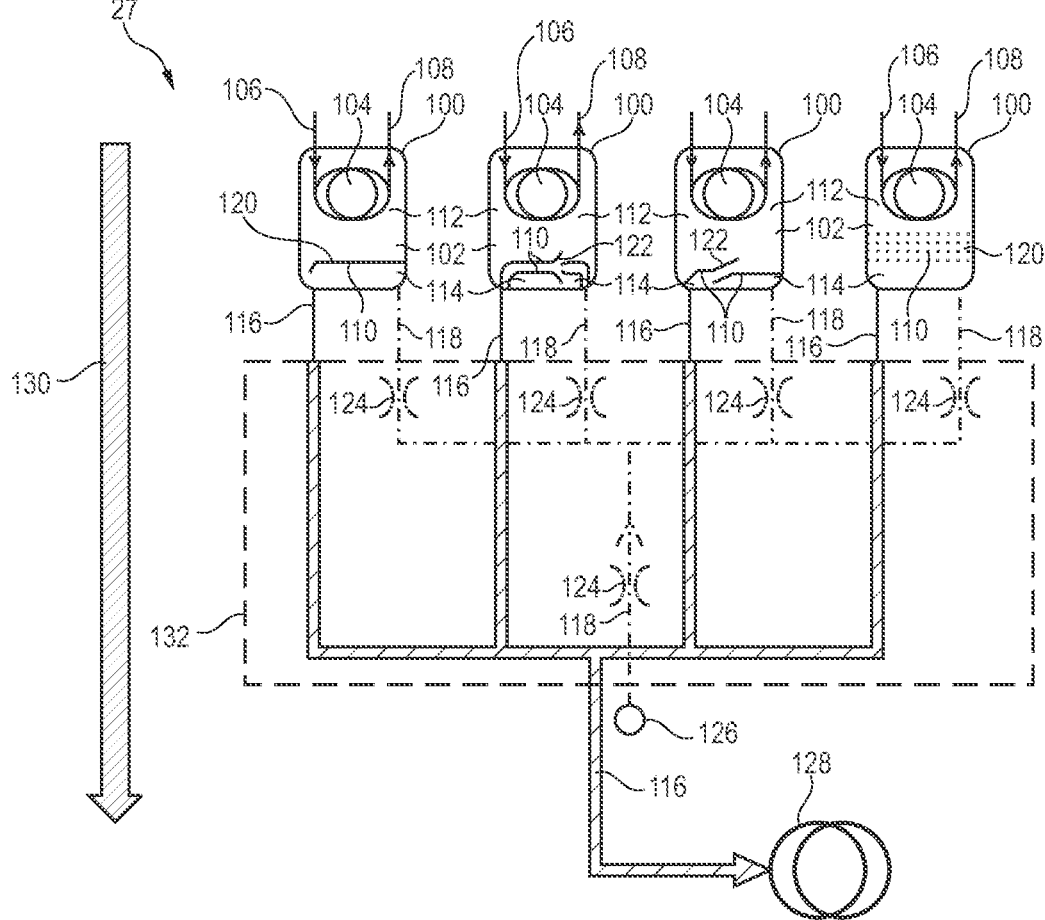
FIG. 2 shows a degasser according to an exemplary embodiment of the present disclosure.

FIG. 2 shows a degasser 27 according to an exemplary embodiment of the present disclosure.

The degasser 27 according to FIG. 2 also serves for degassing a mobile phase, for example a solvent composition. For this purpose, the degasser 27 according to FIG. 2 comprises a plurality of degasser chambers 100, each of which comprising a degasser volume 102 for receiving a respective degassing membrane 104 between a respective mobile phase supply 106 for supplying a respective mobile phase to be degassed and a mobile phase discharge 108 for discharging a respective degassed mobile phase. According to FIG. 2, four degasser chambers 100 are shown, wherein the number of degasser chambers 100 may also be larger or smaller.

Each of the degasser chambers 100 has a delimiting unit 110 for delimiting a first space 112 of the associated degasser volume 102 with respect to a second space 114 of the associated degasser volume 102 while maintaining a fluid connection between the first space 112 and the second space 114, as described with reference to FIG. 1. Consequently, the respective first space 112 in an operation in an environment of the respective degassing membrane 104 comprises a higher partial pressure of vapor of the mobile phase than the assigned second space 114 with a lower partial pressure of vapor of the mobile phase. Due to the respective delimiting unit 110, the respective first space 112 is configured as an idle gas space, whereas the respective second space 114 is configured as a space with a stronger fluid motion. Moreover, the respective delimiting unit 110 is configured to inhibit a flow of vapor of the mobile phase from the first space 112 into the second space 114.

FIG. 2 shows different embodiments of the delimiting units 110: the very left delimiting unit 110 has a delimiting wall 120 with a small opening between the first space 112 and the second space 114. The very right delimiting unit 110 also contains a delimiting wall 120, which however is configured with a porous wall (alternatively a porous filling of a part of the degasser volume 102) instead of a macroscopic opening. Both delimiting units 110 which are illustrated in the center of FIG. 2 respectively comprise a nozzle 122 between the first space 112 and the second space 114. While the left one of these both delimiting units 110 comprises a tube-shaped Venturi-nozzle, the right one of both delimiting units 110 has a planar Venturi-nozzle.

According to FIG. 2, each of the degasser chambers 100 has an assigned suction unit 116 for sucking the gas which passed through the degassing membrane 104 from the second space 114. Advantageously, a respective one of the suction units 116 leads into the assigned second space 114 of the respective degasser chamber 100. Due to the respective suction unit 116, the assigned second space 114 is not an idle gas space, but shows a stronger fluid motion than the assigned first space 112. Advantageously, the suction units 116 are in fluid connection with each other via fluid conduits and are supplied by a commonly used suction source 128 which is here configured as a vacuum pump which supplies all suction units 116 with an underpressure. This allows a compact design of the degasser 27 according to FIG. 2.

Furthermore, according to FIG. 2, each of the degasser chambers 100 has an assigned associated gas supply unit 118 for supplying the associated gas to the assigned second space 114 of the respective degasser chamber 100. Advantageously, a respective one of the associated gas supply units 118 leads into the assigned second space 114 of the respective degasser chamber 100. Each of the associated gas supply units 118 serves for supplying an ambient air in the respective second space 114. Advantageously, the associated gas supply units 118 are in fluid connection with each other via fluid conduits and are supplied by a commonly used associated gas source 126 which here supplies all associated gas supply units 118 with ambient air. Also this promotes a space-saving configuration of the degasser 27 according to FIG. 2.

Descriptively, each of the suction units 116 reduces the pressure in the assigned degasser chamber 100. In contrast, each of the associated gas supply units 118 increases the pressure in the assigned degasser chamber 100. In the cooperation of the delimiting unit 110, the suction unit 116, and the associated gas supply unit 118, the total pressure in the respective first space 112 and in the respective second space 114 may be adjusted to be the same, for example to an underpressure of 100 mbar. In contrast, a pressure in the interior of the mobile phase supply 106 and/or in the interior of the mobile phase discharge 108 may be higher than in the first space 112 and the second space 114, may be atmospheric pressure, for example. Since, according to FIG. 2, a respective suction unit 116 and a respective associated gas supply unit 118 are directly connected to the second space 114 of the assigned degasser chamber 100, the suction unit 116 and the associated gas supply unit 118 are fluidically short-circuited with the first space 112 of the low vapor partial pressure. In other embodiments, the suction unit 116 and/or the associated gas supply unit 118 are not directly connected to the second space 114 of the assigned degassing chamber 100, but indirectly via a further fluid conduit, for example.

FIG. 2 further shows restriction adjustment units 124 for adjusting a fluidic restriction in the respective suction unit 116 and/or in the respective associated gas supply unit 118. According to FIG. 2, the restriction adjustment units 124 are configured as passive restrictions which do not have to be actively controlled. Passive restrictions are constrictions of a lumen or nozzles, for example. It is possible that the passive restrictions dynamically or automatically adapt to the operation conditions. For example, when in the degasser chambers 100 different mobile phases are degassed, an individual adjustment of the restrictions with respect to sucking and/or venting in accordance with the properties of the respective mobile phase may be advantageous.

Reference sign 130 in FIG. 2 shows a partial pressure gradient direction which arises in the degasser 27.

A restriction adjustment unit 124 which is directly connected to the associated gas source 126 may serve as main diffuser of the air ballast, for example may comprise a strong fluidic resistance. Furthermore, this restriction adjustment unit 124 may define a ballast flow.

The restriction adjustment units 124 which are directly connected to the degasser chambers 100 according to FIG. 2 may be air ballast distribution resistances which may have a lower fluidic resistance. These may serve for a homogenous ballast flow distribution. For example, these restriction adjustment units 124 may be configured as tube or conduit or restriction balancing distributing channels.

Reference sign 132 illustrates that the suction units 116 and the associated gas supply units 118 according to FIG. 2 may be configured as gas flow distribution system which may be optionally equipped with valves and/or sensors.

Although not illustrated in FIG. 2, an active valve may be used to further improve the gas exchange and to shorten and/or to improve the starting conditions.

According to FIG. 2, actions for maintaining a partial pressure gradient may be taken. In particular, a separation of a degasser hose and the vacuum terminals may be advantageous. Implementing a gas flow distribution system 132 may be performed by connecting vacuum hoses. A nozzle for generating a constant venting may be formed using one or more injection molded parts, for example.

Figure 3:
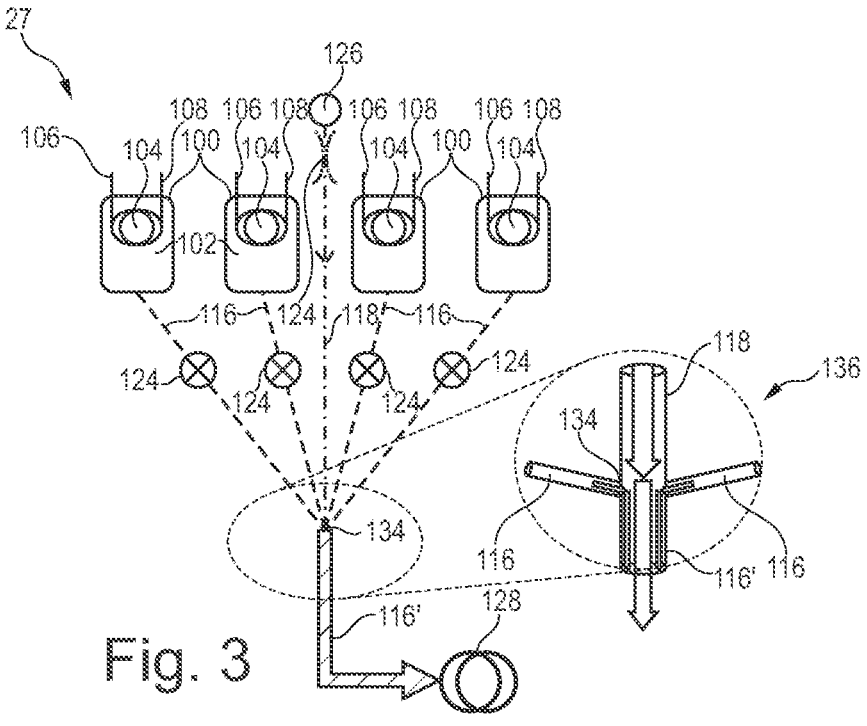
FIG. 3 shows a degasser according to another exemplary embodiment of the present disclosure.

FIG. 3 shows a degasser 27 according to another exemplary embodiment of the present disclosure.

According to FIG. 3, only one single associated gas source 126 of one single associated gas supply unit 118 for supplying the associated gas in a fluid conduit (which may also be denoted as air ballast conduit) which is connected to multiple degasser chambers 100 is illustrated. In more detail, according to FIG. 3, a node point 134 is present, where the only common associated gas supply unit 118 is connected to the suction units 116 which are individually provided for each degasser chamber 100. Furthermore, according to FIG. 3, the degasser chambers 100 are not separated to a respective first space 112 and a respective second space 114 (but may be in an alternative embodiment, such as in FIG. 2).

FIG. 3 further shows restriction adjustment units 124 for adjusting a fluidic restriction in the respective suction unit 116 and/or in the respective associated gas supply unit 118. According to FIG. 3, the restriction adjustment units 124 in the fluid conduits of the suction units 116 are configured as active restrictions (for example active fluid valves) which may be actively controlled, to be able to adapt the respective restriction in a user-defined, application-related and/or dynamic manner.

A detail 136 in FIG. 3 shows how the associated gas supply unit 118 and the suction units 116 may be combined at the node point 134 and are connected with a total conduit 116'. The node point 134 may form a cross connection or a spider connection, wherein the central channel carries the ballast airstream. The side channels may be attached at a sufficient distance with respect to each other, so that the cross-talk between the side channels is avoided by this ballast airstream. Additional actions may be taken, to ensure the stability of the vacuum pressure and/or the persistence of the ballast stream, to avoid pumping into the vacuum chambers and back.

Furthermore, the respective conduit (see reference sign 118 or 116) for the associated gas supply and the associated gas discharge may have a non-circular cross-section at least in the region of the node point 134, in particular a cross-section with recessed inlet channels for the connected suction units 116. Thereby, an even better spatial separation of the gas flows from the chambers of the degasser volumes 102 and an even more efficient suppression of the cross-talk of the chambers of the degasser volumes 102 may be achieved.

Figure 4:
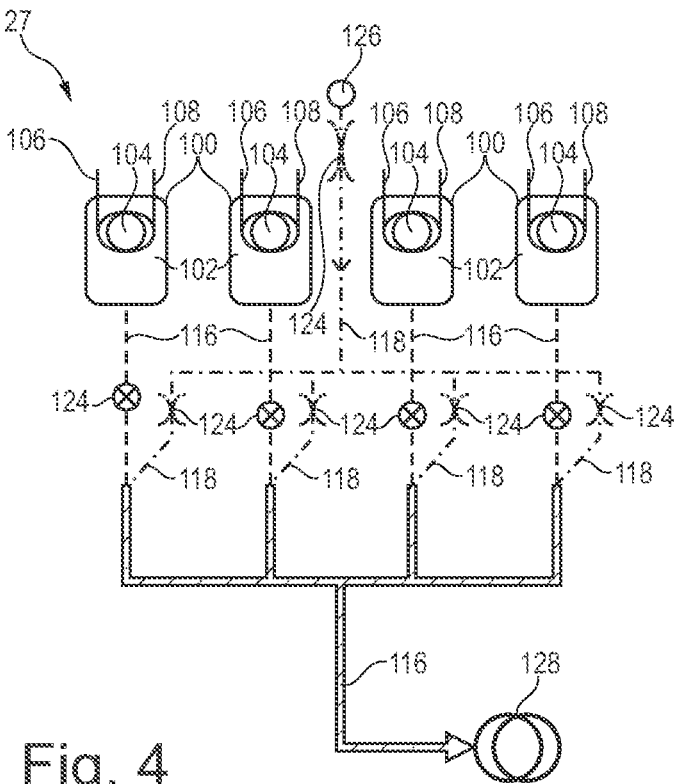
FIG. 4 shows a degasser according to another exemplary embodiment of the present disclosure.

FIG. 4 shows a degasser 27 according to an exemplary embodiment of the present disclosure.

The embodiment according to FIG. 4 differs from the embodiment according to FIG. 3 substantially in that, according to FIG. 4, individual associated gas supply units 118 for each of the degasser chambers 100 are provided. Thus, for each of the degasser chambers 100, an assigned suction unit 116 and an assigned associated gas supply unit 118 are provided. While the respective suction unit 116 leads directly into the assigned degasser chamber 100, the respective associated gas supply unit 118 does not lead directly into the assigned degasser chamber 100, but into the assigned suction unit 116. In each of the individual associated gas supply units 118, also a (for example passive) restriction adjustment unit 124 may be integrated, for example as described according to FIG. 2. In each of the individual suction units 116, also a (for example active) restriction adjustment unit 124 may be integrated, for example as described according to FIG. 3.

According to FIG. 4, an individual ventilating downstream of the vacuum pump is enabled, wherein each degasser chamber 100 has an individually assigned air ballast, and additionally a central ballast diffuser is provided. Additionally ventilating the vacuum pump is optional, for example depending on a vacuum pump with a low velocity or a vacuum pump with a high velocity being used. It should be noted that also in this embodiment, the restriction adjustment units 124 do not have to be mandatorily installed in all suction units 116 and associated gas supply units 118. It may be sufficient that the restriction adjustment unit or restriction adjustment units 124 is or are placed such that each possible connection from the associated gas source 126 to a space or degasser volume 102 leads through at least one restriction adjustment unit 124.

Figure 5:
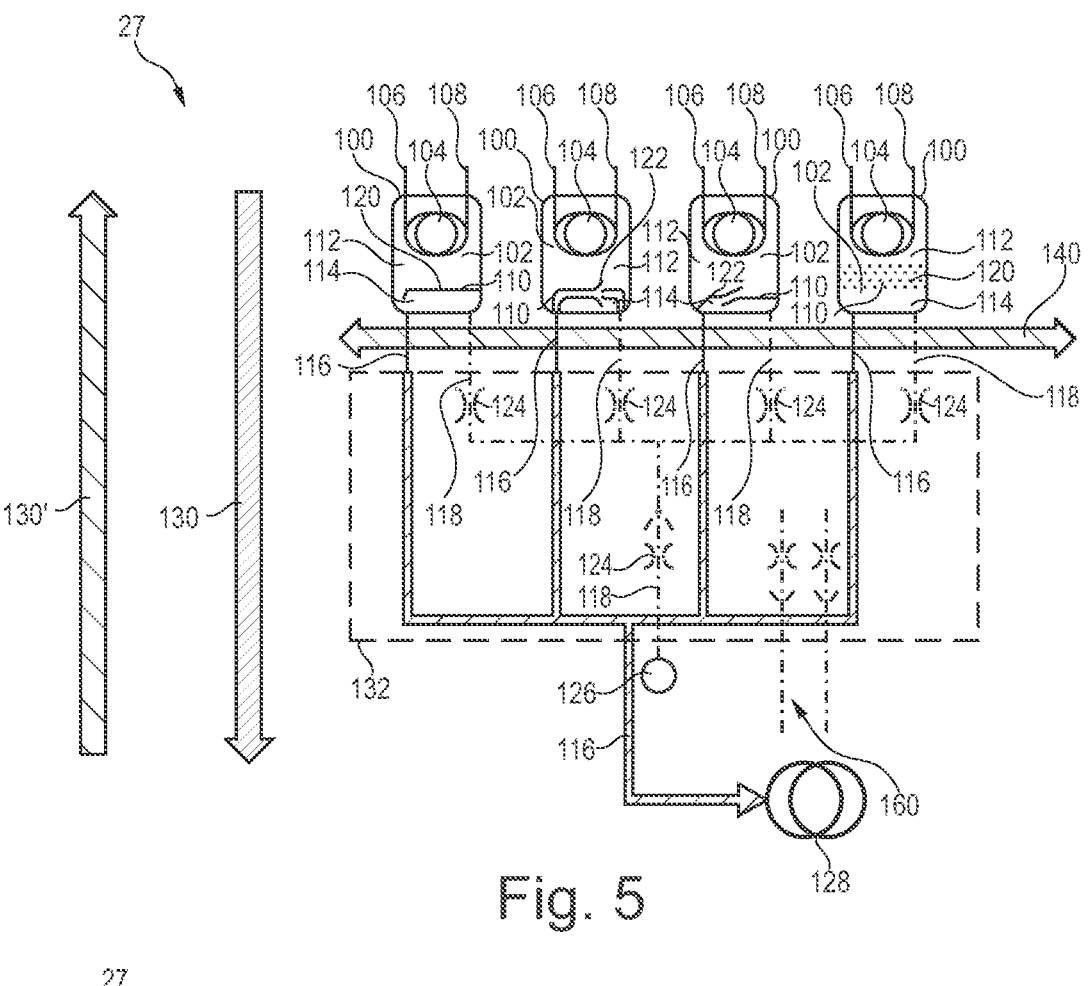
FIG. 5 shows a degasser according to another exemplary embodiment of the present disclosure.

FIG. 5 shows a degasser 27 according to another exemplary embodiment of the present disclosure.

The embodiment according to FIG. 5 is similar to the one according to FIG. 2, but shows, besides the partial pressure gradient direction 130, an inverse partial pressure gradient direction 130'. According to FIG. 5, a partial pressure regulation may be performed passively and/or actively. Furthermore, in FIG. 5, a cross-talk between the degasser chambers 100 is illustrated with the reference sign 140. Such a cross-talk may be suppressed by the associated gas supply units 118.

Also an active valve may be used, to improve the gas exchange or to shorten and/or improve the starting conditions. In an embodiment, active fluid valves may be used which may be switchable or proportional to the control of the gas flow and the partial pressure gradient, to reduce the cross-talk 140 between the degasser chambers 100 and/or to improve the starting conditions (for example in case of a reboot). Such active fluid valves may be implemented as restriction adjustment units 124, in particular in the associated gas supply units 118.

According to FIG. 5, the gas flow distribution system 132 may be active or passive, to improve the starting conditions. For example, a solvent condensation in a vacuum chamber may be suppressed, wherein thereby the robustness of the degasser 27 can be improved.

Figure 6:
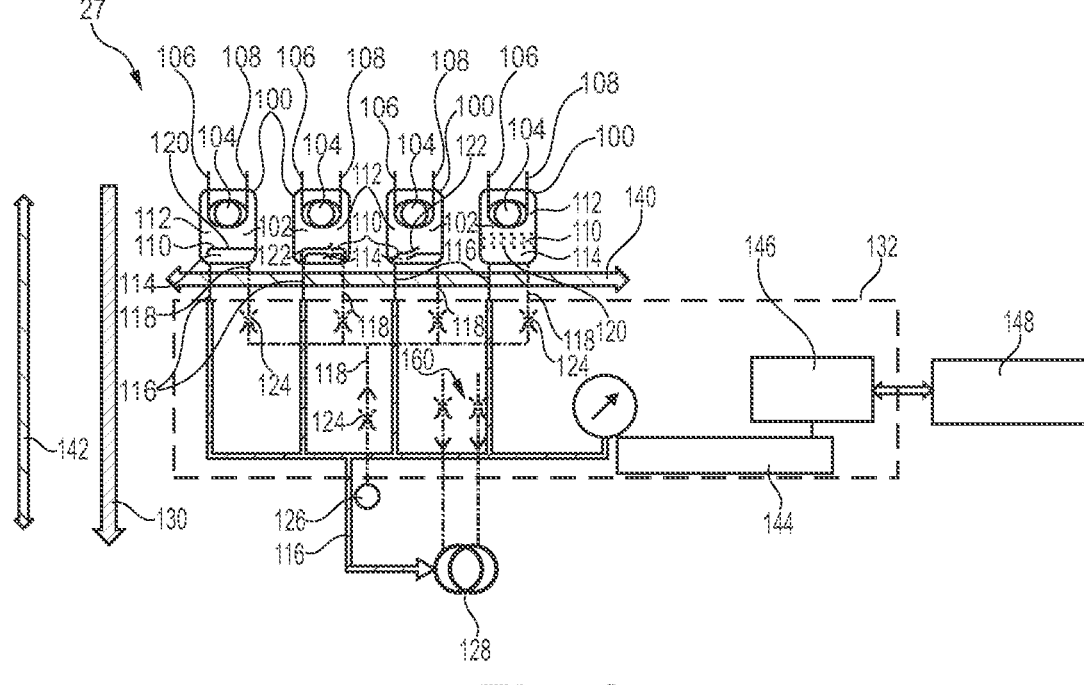
FIG. 6 shows a degasser according to another exemplary embodiment of the present disclosure.

FIG. 6 shows a degasser 27 according to another exemplary embodiment of the present disclosure.

The embodiment according to FIG. 6 differs from the embodiment according to FIG. 5 substantially in that, according to FIG. 6, the gas flow distribution system 132 is further improved. In the gas flow distribution system 132, a pressure sensor 144 for measuring the pressure in the gas flow distribution system 132 is implemented. Sensor signals may be transmitted to a local control unit 146 which in turn may be coupled with a central pump control 148.

The reference sign 142 indicates that phenomena, such as diffusion and/or re-diffusion, may occur.

According to FIG. 6, the venting may be actively controlled. The local control unit 146 may also be used for performing further diagnostics and/or for a preventive maintenance, to overcome critical states (for example when especially volatile solvents are used, for example hexane). Cross-talk or depletion in a solvent may be reduced and controlled by adjusting different airflows in the venting system. The vacuum pressure may be controlled by the local control unit 146 and/or by the central pump control 148, to balance the management of the partial pressure gradient.

Figure 7:
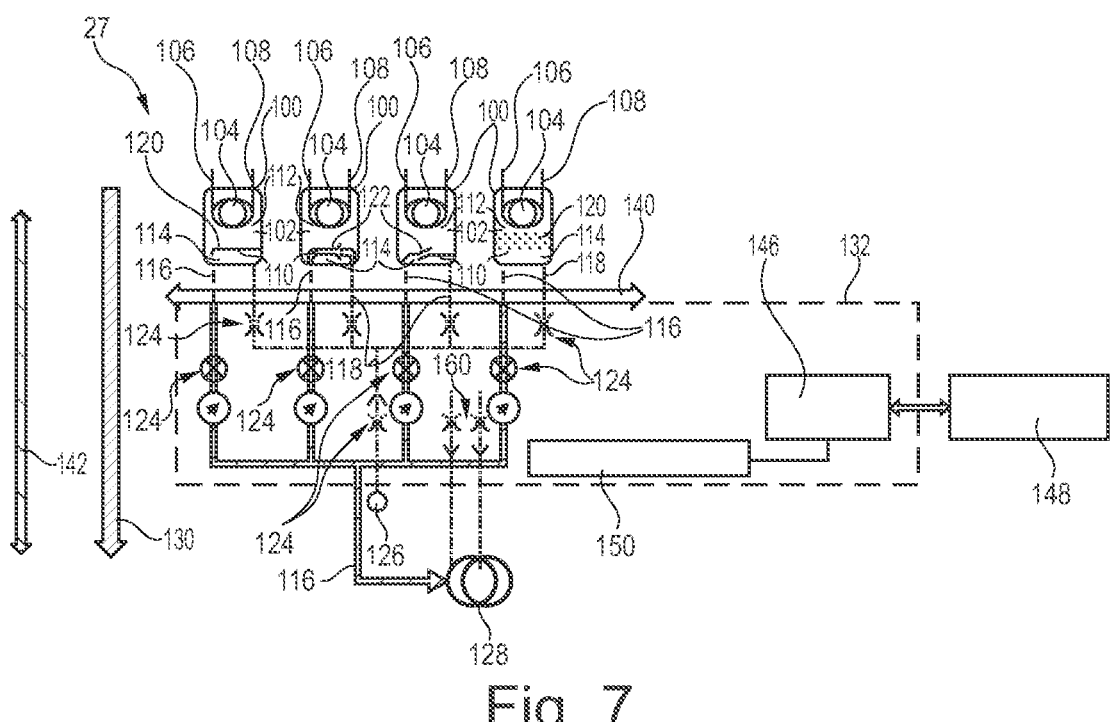
FIG. 7 shows a degasser according to another exemplary embodiment of the present disclosure.

FIG. 7 shows a degasser 27 according to another exemplary embodiment of the present disclosure.

The embodiment according to FIG. 7 differs from the embodiment according to FIG. 6 substantially in that, according to FIG. 7, the pressure sensor 144 is replaced by a pressure sensor array 150.

According to FIG. 7, active valves and pressure sensors may be provided at terminals of vacuum hoses, to individually control the pervaporation for each channel. The configuration may be adapted to individual requirements of a degassing task. The vacuum level may be adapted to the used solvent. The properties of the used solvents, such as the vapor pressure, if necessary depending on the temperature, may be taken from a lookup table, may be input by a user, or may be identified by recognizing and/or tracking the used solvents.

Figure 8:
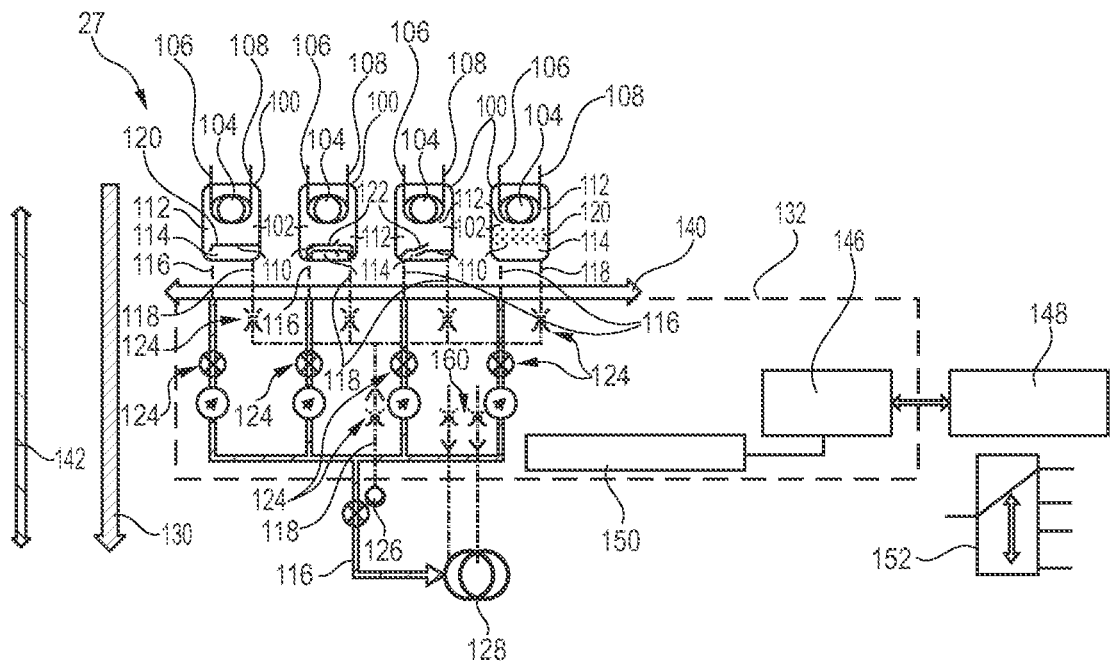
FIG. 8 shows a degasser according to another exemplary embodiment of the present disclosure.

FIG. 8 shows a degasser 27 according to another exemplary embodiment of the present disclosure.

The embodiment according to FIG. 8 differs from the embodiment according to FIG. 7 substantially in that, according to FIG. 8, additionally a multiplexer valve array 152 is provided.

The multiplexer valve array 152 of the gas flow distribution system 132 may control individual vacuum levels and may enable an individual control of the pervaporation.

Figure 9:
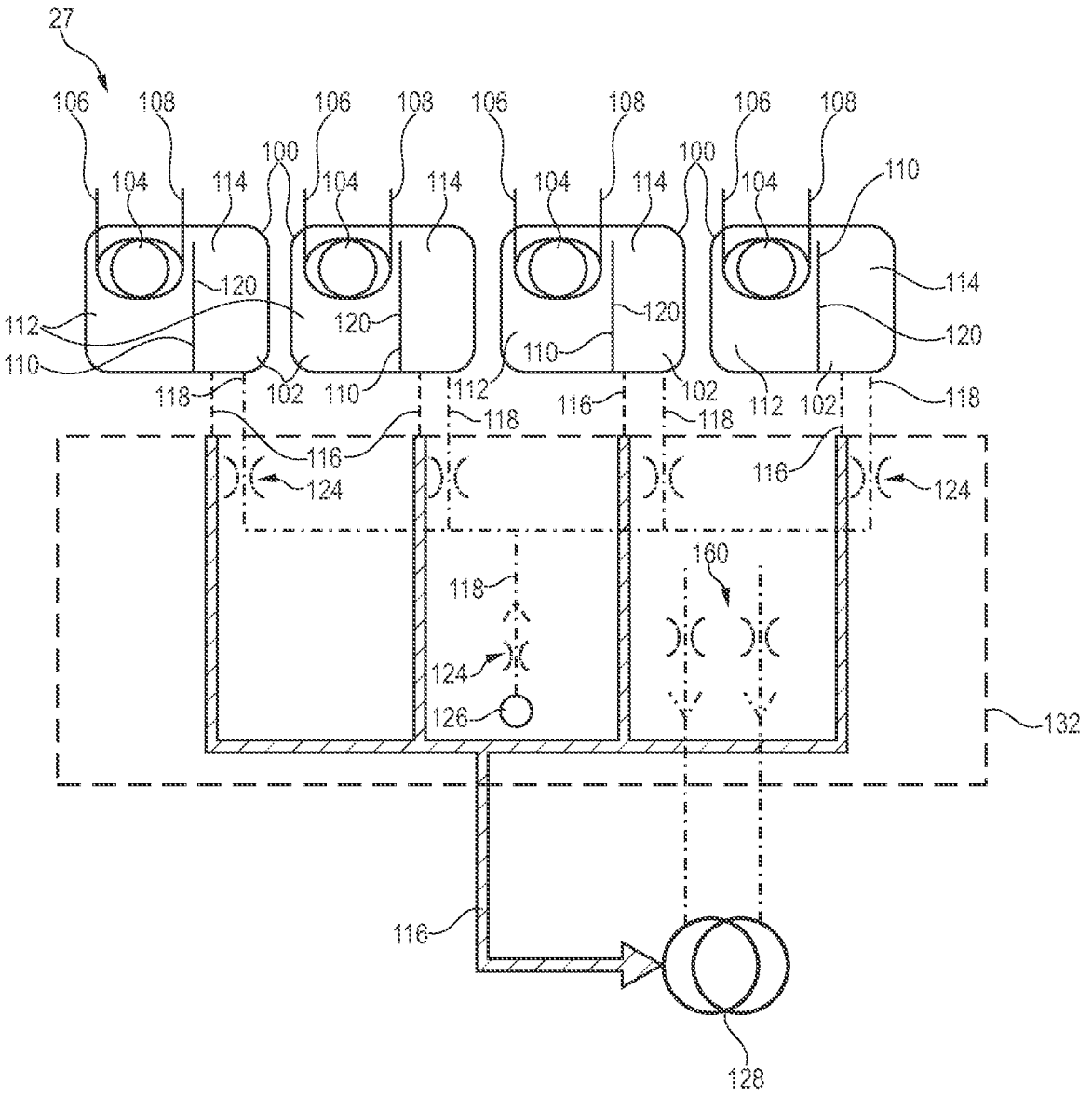
FIG. 9 shows a degasser according to another exemplary embodiment of the present disclosure.

FIG. 9 shows a degasser 27 according to another exemplary embodiment of the present disclosure.

The embodiment according to FIG. 9 differs from the embodiment according to FIG. 5 substantially in that, according to FIG. 9, all degasser chambers 100 have a delimiting wall 120 with a slit as delimiting unit 110. Thus, the embodiment according to FIG. 9 has an especially simple construction of the delimiting unit 110.

Furthermore, the reference sign 160 shows an air ballast for a first and a second stage of a two-stage vacuum pump, wherein the resistance may be adapted to the pump type.

However, a vacuum pump with more or less than two stages and respective gas ballast units may be used.

It should be noted that the term "comprising" does not exclude other elements and the term "a" does not exclude a plurality. Also elements which are described in connection with different embodiments may be combined. It should further be noted that reference signs in the claims are not to be construed as limiting the scope of protection of the claims.

What is claimed is:

1. A degasser for degassing a mobile phase, the degasser comprising:

a degasser chamber with a degasser volume for receiving a degassing membrane;

a delimiting unit configured to delimit a first space of the degasser volume with respect to a second space of the degasser volume while maintaining a fluid connection between the first space and the second space, wherein the first space in an operation in an environment of the degassing membrane comprises a higher partial pressure of vapor of the mobile phase than the second space with a lower partial pressure of vapor of the mobile phase; and a suction unit configured to suck from the second space a gas that passed through the degassing membrane.

2. The degasser according to claim 1, wherein the suction unit leads into the second space.

3. The degasser according to claim 1, comprising an associated gas supply unit configured to supply an associated gas to the second space or in a fluid conduit that is connected to the second space.

4. The degasser according to claim 3, comprising at least one of the following features:

wherein the associated gas supply unit leads into the second space;

wherein the associated gas supply unit is configured to supply air;

wherein the delimiting unit, the suction unit, and the associated gas supply unit are configured to generate substantially the same total pressure in the first space and in the second space;

wherein the delimiting unit, the suction unit, and the associated gas supply unit are configured to generate an underpressure in the first space and in the second space;

wherein the delimiting unit, the suction unit, and the associated gas supply unit are configured to generate an underpressure in a range of 1 mbar to 500 mbar in the first space and in the second space;

wherein the delimiting unit, the suction unit, and the associated gas supply unit are configured to generate an underpressure in a range of 20 mbar to 200 mbar in the first space and in the second space.

5. The degasser according to claim 1, comprising one of the following features:

wherein the delimiting unit comprises a delimiting wall between the first space and the second space;

wherein the delimiting unit comprises a delimiting wall with at least one opening between the first space and the second space;

wherein the delimiting unit comprises a porous delimiting wall between the first space and the second space;

wherein the delimiting unit comprises a nozzle between the first space and the second space;

wherein the delimiting unit comprises a Venturi nozzle between the first space and the second space.

6. The degasser according to claim 1, wherein the first space is configured as an idle gas space.

7. The degasser according to claim 1, wherein the delimiting unit is configured to prevent a transmission of vapor of the mobile phase from the first space to the second space.

8. The degasser according to claim 1, comprising at least one of the following features:

comprising at least one restriction adjustment unit configured to adjust a fluidic restriction in the suction unit;

comprising an associated gas supply unit configured to supply an associated gas in the second space or in a fluid conduit that is connected to the second space, and further comprising at least one restriction adjustment unit configured to adjust a fluidic restriction in the suction unit and/or the associated gas supply unit.

9. The degasser according to claim 3, comprising:

at least one further degasser chamber with at least one further degasser volume for receiving at least one further degassing membrane;

at least one further delimiting unit configured to delimit at least one further first space with respect to at least one further second space of the at least one further degasser volume while maintaining a fluid connection between the at least one further first space and the at least one further second space, wherein the at least one further first space in an operation in an environment of the at least one further degassing membrane comprises a higher partial pressure of vapor of the at least one further mobile phase than the at least one further second space with a lower partial pressure of vapor of the at least one further mobile phase; and at least one further suction unit configured to suck a gas that passed through the at least one further degassing membrane from the at least one further second space, and/or at least one further associated gas supply unit configured to supply an associated gas to the at least one further second space or in at least one further fluid conduit which is connected to the at least one further second space.

10. The degasser according to claim 9, comprising the at least one further suction unit, and further comprising one of the following features:

wherein the suction unit and the at least one further suction unit are in fluid connection with each other;

wherein the suction unit and the at least one further suction unit are in fluid connection with each other and comprise a commonly used suction source;

wherein the suction unit and the at least one further suction unit are fluidically separated from each other;

wherein the suction unit and the at least one further suction unit are fluidically separated from each other and comprise separated suction sources.

11. The degasser according to claim 9, comprising the at least one further associated gas supply unit, and further comprising one of the following features:

wherein the associated gas supply unit and the at least one further associated gas supply unit are in fluid connection with each other;

wherein the associated gas supply unit and the at least one further associated gas supply unit are in fluid connection with each other and comprise a commonly used associated gas source;

wherein the associated gas supply unit and the at least one further associated gas supply unit are fluidically separated from each other;

wherein the associated gas supply unit and the at least one further associated gas supply unit are fluidically separated from each other and comprise separated associated gas sources.

12. The degasser according to claim 9, comprising at least one restriction adjustment unit configured to separately adjust a fluidic restriction in a respective one of the suction units and/or a respective one of the associated gas supply units.

13. The degasser according to claim 8, wherein the at least one restriction adjustment unit is selected from the group consisting of:

at least one actively controllable restriction adjustment unit;

at least one actively controllable fluid valve;

at least one passive restriction adjustment unit;

at least one passive nozzle;

at least one passive diffuser;

at least one tapered portion of a fluidic conduit; and at least one fluidic conduit, wherein a portion of the fluidic conduit comprises at least one curve and/or at least one arc for increasing the fluidic restriction.

14. A sample separation device for separating a fluidic sample, the sample separation device comprising:

a fluid drive configured to drive the fluidic sample that is in a mobile phase;

a sample separation unit configured to separate the fluidic sample that is in the mobile phase; and the degasser according to claim 1 for degassing the mobile phase prior to supplying the mobile phase to the fluid drive.

15. The sample separation device according to claim 14, further comprising at least one of the following features:

the sample separation unit is configured as a chromatographic sample separation unit or column;

the sample separation device is configured to analyze at least one physical, chemical and/or biological parameter of at least one fraction of the fluidic sample;

the sample separation device comprises at least one of: a detector device; a device for a chemical, biological and/or pharmaceutical analysis; a liquid chromatography device; a high-performance liquid chromatography device;

the fluid drive is configured for driving the mobile phase with a pressure of at least 100 bar;

the fluid drive is configured for driving the mobile phase with a pressure of at least 500 bar;

the fluid drive is configured for driving the mobile phase with a pressure of at least 1000 bar;

the sample separation device is configured as a microfluidic device;

the sample separation device is configured as a nanofluidic device;

the sample separation device comprises an injector unit configured to introduce the fluidic sample in a fluidic path between the fluid drive and the sample separation unit;

the sample separation device comprises a detector configured to detect the separated fluidic sample;

the sample separation device comprises a sample fractionator configured to fractionize the separated fluidic sample or a drain container.

16. A method for degassing a mobile phase, the method comprising:

receiving, in a degasser chamber with a degasser volume, a degassing membrane;

delimiting a first space of the degasser volume with respect to a second space of the degasser volume by a delimiting unit while maintaining a fluid connection between the first space and the second space, wherein the first space in an operation in an environment of the degassing membrane comprises a higher partial pressure of vapor of the mobile phase than the second space with a lower partial pressure of vapor of the mobile phase; and sucking from the second space a gas that passed through the degassing membrane by a suction unit.

* * * * *